United States Patent [19]
O'Donnell

[11] Patent Number: 6,134,386
[45] Date of Patent: *Oct. 17, 2000

[54] PANEL HEATER FOR ANIMAL USE

[76] Inventor: James Martin O'Donnell, Tierlahood, Stradone, Co. Cavan, Ireland

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,201

[22] Filed: Jul. 19, 1996

[51] Int. Cl.$^7$ .............................. H05B 3/06; F24D 19/02
[52] U.S. Cl. .......................................... 392/432; 219/542
[58] Field of Search .................................. 392/432, 433, 392/435, 436; 219/542, 532, 536, 537, 213; 338/315, 317; 165/49; 373/127–134; 432/31; 119/307

[56] References Cited

U.S. PATENT DOCUMENTS

| | | | |
|---|---|---|---|
| 3,591,753 | 7/1971 | Gartner | 219/464 |
| 3,737,624 | 6/1973 | Eilenberger | 219/525 |
| 3,809,859 | 5/1974 | Wells | 219/345 |
| 3,866,016 | 2/1975 | Tombu | 219/213 |
| 3,947,658 | 3/1976 | Sato et al. | 219/504 |
| 3,984,616 | 10/1976 | Beck | 13/25 |
| 3,992,609 | 11/1976 | Alexander | 219/432 |
| 4,247,979 | 2/1981 | Eck | 29/611 |
| 4,471,214 | 9/1984 | Gossler | 219/464 |
| 4,806,064 | 2/1989 | Breese | 411/479 |
| 5,028,760 | 7/1991 | Okuyama | 392/435 |
| 5,592,647 | 1/1997 | Yamauchi et al. | 392/432 |
| 5,624,750 | 4/1997 | Martinez et al. | 428/344 |

FOREIGN PATENT DOCUMENTS

| | | | |
|---|---|---|---|
| 385858A1 | 2/1990 | European Pat. Off. . | |
| 385858 | 5/1990 | European Pat. Off. | 411/514 |
| 0598401A1 | 10/1993 | European Pat. Off. . | |
| 2635921A1 | 2/1978 | Germany . | |
| 3817573A1 | 12/1989 | Germany . | |

*Primary Examiner*—Philip H. Leung
*Assistant Examiner*—Daniel Robinson
*Attorney, Agent, or Firm*—Jacobson, Price, Holman & Stern, PLLC

[57] ABSTRACT

A panel heater for animals of generally rectangular slab-like shape. The panel heater has sloping sides to accommodate animals and comprises basically a shell into which a fire retardant material is poured around electrical resistance wire. Anchorage is provided to ensure that there is adequate keying between the fire retardant material and the shell to prevent degradation during use. Various support devices are provided for the heating element which is formed from an electrical resistance wire. A two-stage pouring of the fire retardant material is used to prevent the possibility of accidents by keeping the electrical resistance wire away from the outer surface.

18 Claims, 3 Drawing Sheets

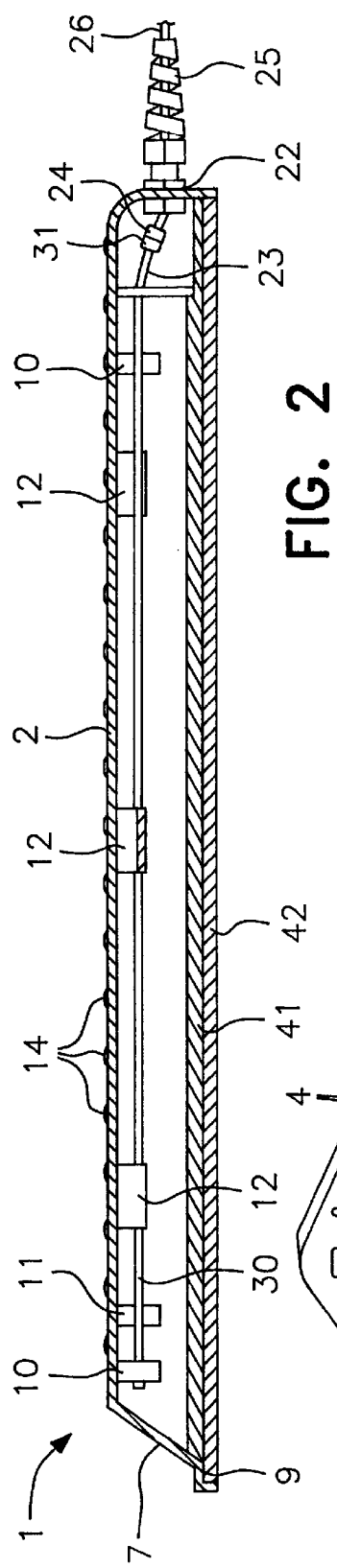
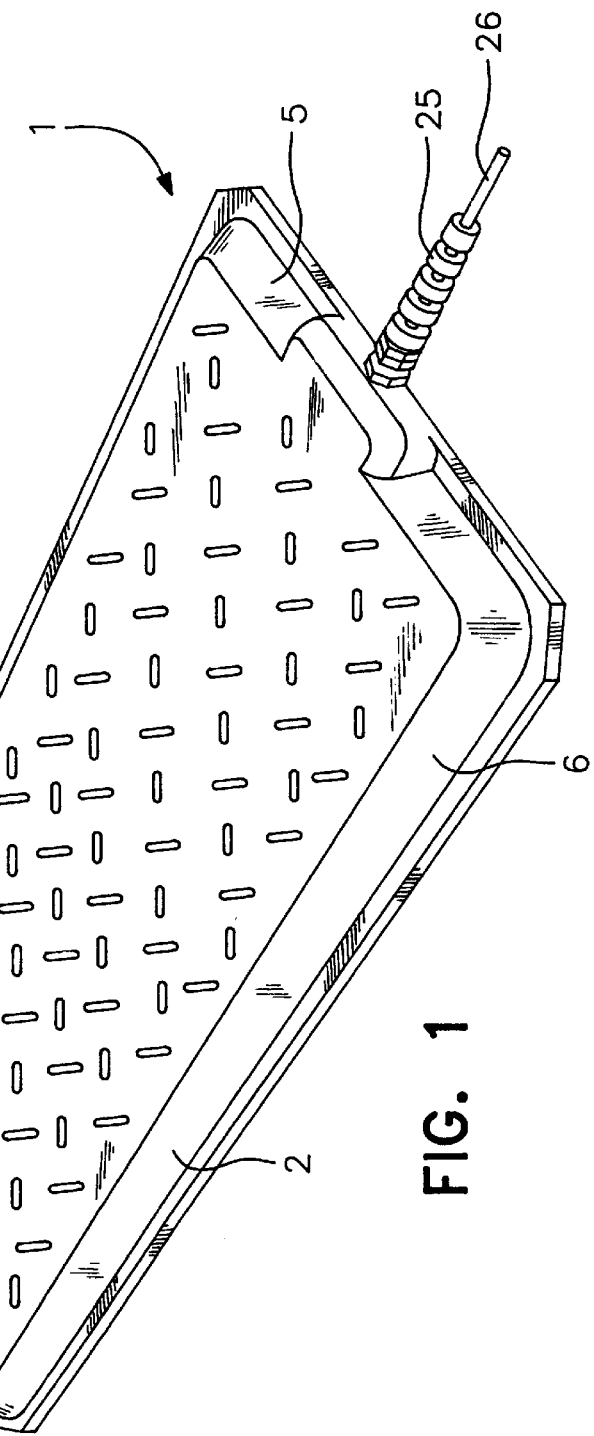
FIG. 1
FIG. 2

PANEL HEATER FOR ANIMAL USE

BACKGROUND OF THE INVENTION

1. Field of the Invention

This invention relates to a panel heater for animal use and to a method of manufacturing such a panel heater. Generally, they comprise a body member of slab like shape, the body member comprising an external shell or frame and a heating means embedded within a matrix or quantity of fire retardant material, the fire retardant material being mounted within a shell or frame.

2. Background Information

Before my invention disclosed in British Patent Specification No. GB 2 289 608 (O'Donnell) all known panel heaters of this type were made in a mould and removed from the mould when manufacture was complete. For example, European Specification No. 598 401 (Bernhard) describes a panel heater comprising a zigzag flexible electrical conductor mounted on a grid-like frame, both the conductor and the frame being sandwiched between two layers of fire resistance material, namely, an artificial stone layer and a natural stone slab. This heater is produced in a number of separate moulding stages, thus making it time consuming and relatively expensive to produce. The use of both the grid-like frame upon which the conductor is mounted and the natural stone slab add to the expense of the panel heater.

A further example of this type of panel heater is described in Irish Short Term Patent No. IES 59643 (McGorry). This specification describes a panel heater comprising a body member of slab-like shape, the body member comprising a shell having an outer major surface forming a heat exchange surface, an electrical heating element mounted within the shell and supported by a number of spaced-apart bollards, a matrix of fire retardant material mounted within the shell around both the heating element and the bollards and an insulating panel positioned between the matrix and the base of the shell. However, as this panel is completely produced in a mould and involves a number of moulding steps, the process is very complicated. For example, the shell of the heater described in IES 59643 is moulded in at least four separate stages, each stage involving a curing step. This is very time consuming and therefore makes such a panel heater very expensive to produce. A further problem with the panel heater described in IES 56943 is that it is extremely difficult to inspect both surfaces of the shell before proceeding with the further moulding stages.

Most of the problems with these known panel heaters were solved by the invention of the present applicant, described and claimed in the above mentioned British Patent Specification No. GB 2 289 608. This specification describes a process for producing a panel heater, which comprises securing a plurality of bollards on a base of an open mouthed rectangular box and placing an electric heating element having end connectors around the bollards. The end connectors are engaged within an internal connector housing. A quantity of fire retardant material is cast in the box about the electrical heating elements and the bollards and allowed to set before being covered with an insulating panel. A closing lid is then attached to the open mouthed rectangular box to form the base of the panel heater. This specification also describes a jig for securing the bollards to the base of the open mouthed rectangular box which jig can be removed after casting of the fire retardant material. This invention allowed the panel heaters to be produced simply and cheaply and it has indeed proved to be a most successful and useful panel heater.

Some problems have arisen in the practice with the use of panel heaters manufactured in accordance with the invention of this GB Patent Specification No. 2,289,608 (O'Donnell).

Firstly, quite strangely, it has been discovered that the actual shape of the panel heater, namely, its slab-like shape with vertical sides caused animals and in particular pigs considerable discomfort. This was surprising as there did not seem to be any reason why it should do so. However, the solid vertical sides of the panel heater, did cause some difficulty for the pigs, not alone in getting on top of the panel heater, but in coming off it, in that they tended to damage themselves, either getting on or getting off the panel heater: it caused them some discomfort, but not necessarily serious discomfort. A second problem that was noted was the fact that in certain cases the location of the electrical heating element within the panel heater was not ideal in that in some cases minor damage to the panel by an animal's hoof led to the exposure of the electrical heater element with consequent injury if not death of the animal. It quickly became apparent in use that there was a need to provide a better construction of panel heater that would overcome these problems.

Further it was found important to ensure that any fire retardant material cast in the panel heater, be securely keyed to the shell because during use there were problems in that the fire retardant material filling the shell separated internally from the shell under the continual loading and unloading of the panel heater by the animals using it. This in turn led to cracks and other damage to the shell destroying the structural integrity of the panel. It has however to be emphasised that this happened only after continuous use, if not mis-use.

OBJECTS

The present invention is directed towards overcoming the difficulties inherent in the panel heaters known at present and in particular to providing an improved construction of the particular type of the panel heater first disclosed in British Patent Specification No. GB 2 289 608. It is also directed towards providing a method of manufacture which increases the safety of the panel heater in use.

SUMMARY OF THE INVENTION

According to the invention there is provided a panel heater for animal use comprising:

a hollow substantially rectangular open-mouthed container-like outer shell, having a base, the outer surface of which forms an animal contacting heating surface and four upstanding outwardly inclined side walls;

a plurality of upstanding bollards mounted on the base within the shell;

a separate rectangular electrical junction box within the shell formed from three upstanding interior walls mounted on the base and contacting the interior of a side wall thereof and having exterior communication means for electrical power supply cable formed by a hole in the side wall and interior communication means formed from a pair of spaced apart holes in an interior wall thereof;

base connectors within the junction box for connection to electrical power cables and to a heating element;

a heating element formed from an electrical resistance wire having a pair of end connectors fast on the base connector in the junction box, the electrical resistance wire being led through one of the holes in an interior wall of the junction box around the bollards to form one continuous path of wire within the shell and then back through the other hole to the base connector;

a plurality of anchorage means mounted on the base within the shell, each anchorage means having at least one surface spaced apart from, above and facing the inner surface of the base;

fire retardant material filling the shell to above the electrical resistance wire;

a heat insulation panel mounted on top of the fire retardant material; and a closure lid, forming the ground contacting base of the panel heater, mounted on the heat insulation material to close the shell.

The advantage achieved by the invention is that the anchorage means ensures that the retardant material will be securely keyed to the shell and that further the slanting sides of the upstanding side walls of the shell are particularly advantageous in that they avoid injury to animals and ease of use of the panel heater. It also increases its resistance to damage by the animals.

In one particular embodiment of the invention each anchorage means comprises an upstanding bored plate with its bore axis substantially parallel to the plane of the base. This is a particularly easy and useful construction of anchorage means.

The invention also provides an anchorage means which comprises a tunnel-like body formed from a substantially half-cylindrical shaped member. This tunnel-like body is particularly useful in that it forms a very good key for the fire retardant material. It may also house the electrical resistance wire.

Ideally there are additional anchorage means mounted on the interior of the side walls of the shell. The advantage of this is that with these anchorage means, you ensure that not alone will the fire retardant material remain in close contact with the base of the shell, but also if any flexing of the sides of the shell or panel should occur in use, this will not cause the fire retardant material to separate therefrom.

In one particular embodiment of the invention there are four corner bollards adjacent each corner of the base and in which the remainder of the bollards form two sets of opposed in-line side bollards sited inwards of a pair of adjacent corner bollards, one of the sets of side bollards being adjacent the side wall forming part of the junction box. This particular arrangement is particularly useful for providing adequate coverage of the interior of the panel heater with heater elements.

In this latter embodiment, a particularly useful form of it is to have a corner bollard adjacent each corner of the base and in which the remainder of the bollards form two sets of opposed in-line side bollards sited inwards of a pair of adjacent corner bollards, one of the set of side bollards comprising a pair of bollards adjacent the side wall forming part of the junction box and the other set comprising four side bollards. This leads to a very efficient and even heat distribution across the panel, adding further to the comfort for the animal.

In another embodiment of the invention each bollard has an arcuate cylindrical resistance wire contacting surface and includes additional anchorage means adjacent the free end thereof, said anchorage means having at least one surface spaced-apart from, above and facing the inner surface of the base. By providing an anchorage means adjacent the top of the bollard, you ensure, particularly where as is described hereinafter, there are advantages in making a two-part pouring of the fire retardant, that the fire retardant material is securely retained within the panel heater. In any event the use of additional anchorage means will ensure that the fire retardant material is securely housed within the panel heater.

One particularly suitable form of anchorage means is formed by a capping member projecting laterally of the free end of the bollard. This is a particularly useful way of manufacturing an anchorage.

In one embodiment of the invention each side wall is bent outwards adjacent its free edge substantially parallel to the base and then substantially vertically to form a recess for reception of the lid. The advantage of this is that a very good keying is provided for the lid which is now recessed within the shell, preventing damage and ensuring that it is securely mounted therein.

The invention further provides a panel heater for animal use comprising:

a hollow substantially rectangular open-mouthed container-like outer shell, having a base, the outer surface of which forms an animal contacting heating surface and four upstanding outwardly inclined side walls;

a plurality of upstanding bollards each having an electrical resistance wire support and each bollard being mounted on the base within the shell;

a separate rectangular electrical junction box within the shell formed from three upstanding interior walls mounted on the base and contacting the interior of a side wall thereof and having exterior communication means for electrical power supply cable formed by a hole in the side wall and interior communication means formed from a pair of spaced apart holes in an interior wall thereof;

base connectors within the junction box for connection to electrical power cables and to a heating element formed from a spirally wound cable gland;

a heating element formed from an electrical resistance wire having a pair of end connectors connected to the cable gland, the electrical resistance wire being led through one of the holes in an interior wall of the junction box around the bollards to form one continuous path of wire within the shell and then back through the other hole to the cable gland;

a plurality of anchorage means mounted on the base within the shell, each anchorage means having at least one surface spaced apart from, above and facing the inner surface of the base;

fire retardant material filling the shell to above the electrical resistance wire;

a heat insulation panel mounted on top of the fire retardant material; and a closure lid, forming the ground contacting base of the panel heater, mounted on the heat insulation material to close the shell.

The advantage of this construction is that there is an electrical resistance wire support which ensures that it is always located in the optimum position within the panel heater. Further it has been found that the use of a cable gland is particularly advantageous in that it ensures that connections are not broken even under extreme use conditions.

Preferably the electrical resistance wire support is formed by a recess in the bollard as this facilitates the leading of electrical resistance wire around the bollards and retains them in position without the need for any further fixing.

Further the invention provides a method of manufacturing a panel heater for animal use of the type comprising a body member in the form of a slab having an upper animal contacting heating surface and a ground contacting base, comprising the steps of:

forming an open-mouthed container-like outer shell having a base and four upstanding side walls, a plurality of bollards mounted on the base within the shell, a separate rectangular electrical junction box within the shell formed from three upstanding interior walls on the base and portion of a side wall, an electrical power supply cable receiving hole in the side wall forming part of the junction box and a pair of spaced apart holes in an interior wall for electrical resistance wire and a plurality of anchorage means on the base, each anchorage means having at least one surface spaced apart from and facing the inner surface of the base;

leading an electrical resistance wire out of the junction box through one of the pair of holes and relatively loosely around the bollards and back through the other hole;

delivering a first quantity of settable fire retardant material into the shell to float the electrical resistance wire adjacent the surface thereof suitably spaced apart from the base;

allowing the fire retardant material to set sufficiently to secure the electrical resistance wire in position;

delivering a second quantity of fire retardant material into the shell to cover the electrical resistance wire to the desired depth;

covering the fire retardant material with a heat insulation panel; and attaching a closure lid to the shell to form a ground contacting base for the panel heater.

The advantage of this is that the fire retardant material can be used to float the electrical resistance wire to the correct height above the base and thus the correct distance below the animal contacting heating surface.

Further the invention envisages adding intermediate anchorage means to the first fire retardant material to project proud thereof prior to pouring the second fire retardant material. The advantage of intermediate anchorage means is it will ensure that where there are two layers of fire retardant material that they will adequately key together and that physical break-down between the two layers will not occur.

BRIEF DESCRIPTION OF THE DRAWINGS

Other features and advantages of the invention will be apparent from the following description taken in connection with the accompanying drawings, wherein FIG. 1 is a perspective view of a panel heater for animal use in accordance with the invention;

FIG. 2 is a longitudinal sectional view of the panel heater;

DESCRIPTION OF THE PREFERRED EMBODIMENTS

Figure 3:
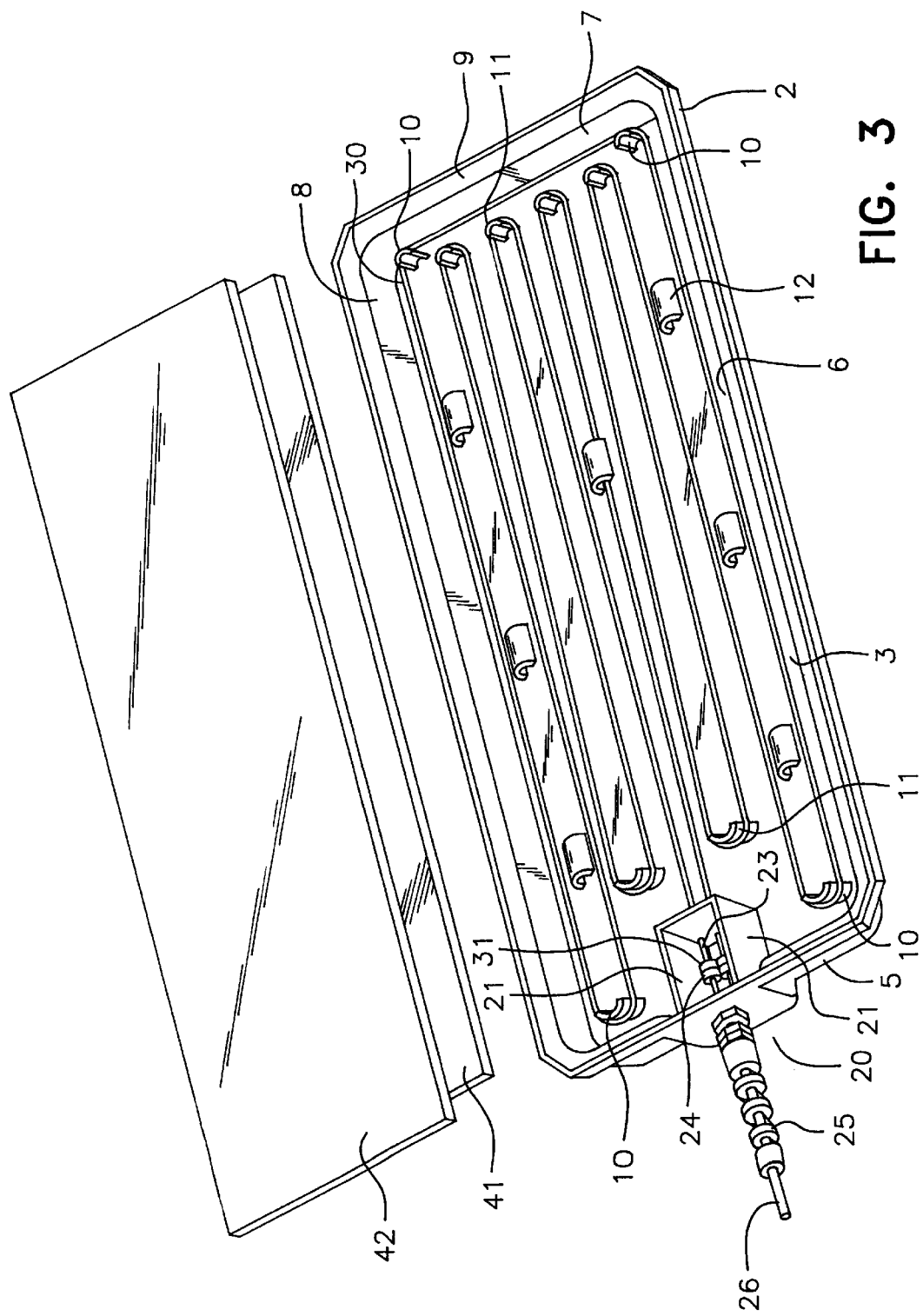
FIG. 3 is an exploded view of the panel heater immediately prior to the final stages of manufacture.

Referring to the drawings and initially to FIGS. 1 to 4 thereof, there is provided for animal use a panel heater, indicated generally by the reference numeral 1. The panel heater 1 comprises a hollow substantially rectangular open-mouthed container-like outer shell 2 having a base 3 the outer surface of which carries dimples 4 which forms an animal contacting heating surface. Mounted on the base 3 are four upstanding outwardly inclined side walls 5, 6 7 and 8 each of which is bent outwards adjacent its free end substantially parallel to the base 3 and then substantially vertically to form a recess 9 for reception of a lid, as will be described below.

A plurality of upstanding bollards, namely corner bollards 10 and in-line side bollards 11 are mounted on the base 3 within the shell 2. Each bollard 10 and 11 has an arcuate cylindrical resistance wire contacting surface as can be seen from the drawings.

Anchorage means comprising a tunnel-like body formed from a plurality of substantially half-cylindrical shaped member 12 are mounted on the base 3. A separate rectangular electrical junction box indicated generally by the reference numeral 20 is formed from three upstanding interior walls 21 and portion of the side wall 5 which is substantially vertical on the base 3 and includes an exterior communication means for an electrical power supply cable, formed by a hole 22 and interior communication means formed by a pair of spaced apart holes 23. The junction box 20 houses a base connector formed from a pair of bullet connectors 24 and includes a spiral cable gland 25 for mains cable 26. A heating element formed from an electrical resistance wire 30 having a pair of end connectors 31 connected to the bullet connectors 24 is led through a hole 23 around the bollards 10 and 11, as shown in FIG. 3, and back through the other hole 23 to the bullet connector 24. In this embodiment the wire is fed through some of the members 12. This forms one continuous path of wire within the shell 2. The shell 2, except for the junction box 20, is then partially filled with a fire retardant material not shown in FIG. 2, then covered by a heat insulation panel 41 and a lid 42, which engages in the recess 9.

A sensor housing 45 may be provided for reception of, for example, a thermometer, thermal cut out or the like.

In use the panel heater 1 is particularly suitable for a livestock unit, for example a pig farrowing unit. The inclined side walls facilitate the pig in getting on and off the panel heater 1.

The particular construction of shell 2 ensures that the lid 42 is securely fixed in position and forms with the side walls 5, 6, 7 and 8 a suitably rigid structure. Further the anchoring members, in this case the half-cylindrical shaped members 12 ensure that the fire retardant material bonds closely therewith as the members 12 have a surface which is spaced apart above and facing the inner surface of the base 3, thus, ensuring that fire retardant material will not, in use, be forced down away from the base 3 if the heater panel flexes.

In manufacturing the panel heater 1 ideally the shell is formed together with the bollards and the junction box and anchorage means so that the assembled shell is ready for the insertion of the electrical resistance wire. This may be manufactured either in a series of steps as described in GB Patent Specification No. 2 289 608 or, alternatively, it may be moulded in one piece. Then, the electrical resistance wire is led out of the junction box to one of the pair of holes and relatively loosely around the bollards. In this way, when the fire retardant material which is settable is poured into the shell, the fire retardant material will allow the electrical resistance wire to float upwards away from the base of the shell, thus ensuring that if damage occurs to the base that there will be a considerable amount of fire retardant material between the heating surface and the electrical resistance wires, thus, ensuring that it is highly unlikely that an animal will be electrocuted in the event of physical damage to the panel heater. When the fire retardant material has been poured and has set, the insulation panel 41 is then placed in position and finally the lid 42 is attached to the shell.

In another method of manufacturing a panel heater according to the invention, there is delivered a first quantity of settable fire retardant material into the shell to float the electrical resistance wire adjacent the surface thereof, suitably spaced apart from the base. The fire retardant material is then allowed set or partially set before a second quantity of fire retardant material is poured into the shell. This second quantity of fire retardant material will cover the electrical resistance wire which will already have been floated to the desired depth. This further ensures that the resistance wire can be easily placed in position and will attain the correct position sufficiently close to the base of the panel heater on which the animal will be lying to give adequate heating and still sufficiently spaced therefrom to comply with normal safety requirements.

Figure 5:
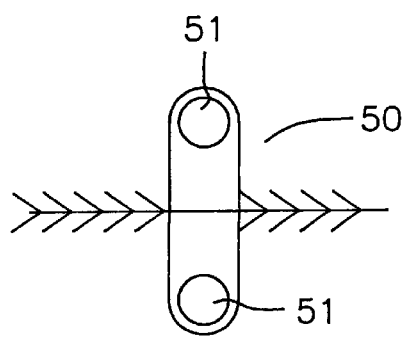
FIG. 5 is a front view of an intermediate anchorage means embedded in fire retardant material.
Figure 6:
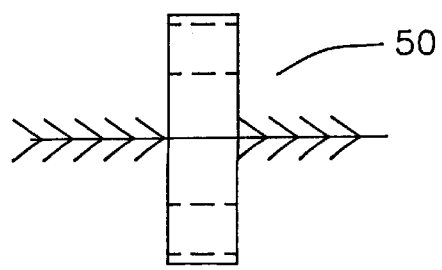
FIG. 6 is an end view of the intermediate anchorage means of FIG. 5.

Referring to FIGS. 5 and 6 there is illustrated an additional intermediate anchorage means indicated generally by the reference numeral 50 which is simply a plate having a pair of holes 51 which is placed in a first quantity of fire retardant material 52 before a second quantity 53 is poured thereon. The intermediate anchorage means 50 can be made of a material so that it will float in this manner on the first quantity of fire retardant material 52 or alteratively can be pushed into the fire retardant material somewhat before it sets fully. This, forms a good key between the two layers of fire retardant material 52 and 53.

The advantage of this method is that it facilitates the placing of the electrical resistance wire in position by relatively unskilled labour.

Figure 7:
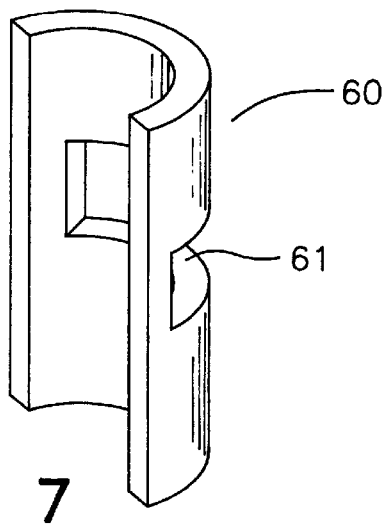
FIG. 7 is a perspective view of another construction of bollard for use in the panel heater.
Figure 4:
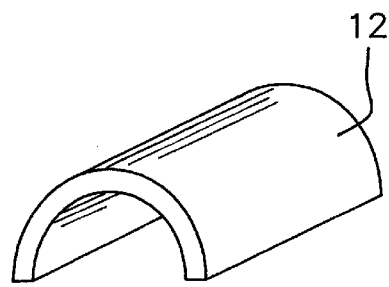
FIG. 4 is a perspective view of an anchorage means forming part of the panel heater.

Referring to FIG. 7 there is illustrated an alternative construction of bollard, indicated generally by the reference numeral 60 which is substantially similar in construction to the bollards 10 and 11 previously described. However, in this construction of bollard 60 there is provided a recess 61 by a simple cut-out intermediate the ends of the bollard, which recess 61 receives and supports electrical resistance wire and further facilitates the wiring of the panel heater.

Figures 8, 9:
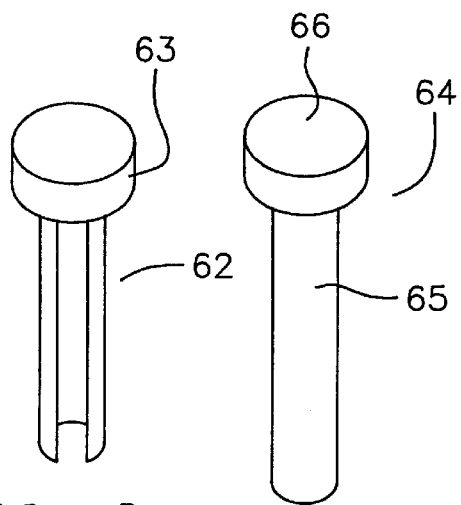
FIG. 8 is a perspective view of an alternative construction of bollard for use with the invention.
FIG. 9 is a perspective view of a still further construction of bollard.

Referring to FIG. 8 there is illustrated a still further construction of bollard, indicated generally by the reference numeral 62, which includes additional anchorage means formed by a capping member 63. This construction of bollard 62 may also be provided with a recess similar to the recess 61, as indeed can a bollard 64 illustrated in FIG. 9 which bollard 64 is formed from a cylindrical bar 65 terminating in a cap 66. The advantage of the provision of the additional anchorage means formed by the capping member 63 and the cap 66 is that it further locks the fire retardant material in position. This is particularly advantageous when the fire retardant material is poured in two quantities. It will also be appreciated that the recess 61 will, in addition to maintaining and securing the electrical resistance wire in position, also form another anchorage means for the fire retardant material.

Figure 10:
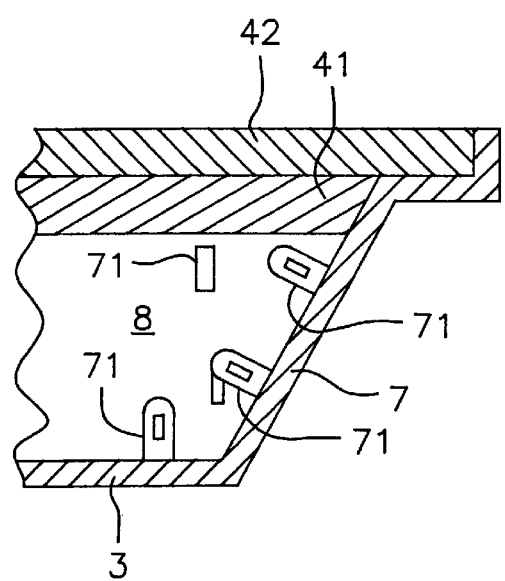
FIG. 10 a sectional view of portion of an alternative construction of panel heater.

Referring to FIG. 10 there is illustrated an alternative construction of panel heater, indicated generally by the reference numeral 70 in which parts similar to those described with reference to the previous drawings are identified by the same reference numerals. In this embodiment, the anchorage means is mounted not alone on the base 3, but also on each side wall only the sidewalls 7 and 8 being shown. The anchorage means comprises an upstanding bored plate 71 which projects outwardly of the sidewalls 7 and 8. This additional anchorage ensures that the fire retardant material is further bonded to the shell.

By ensuring adequate bonding between the shell and the fire retardant material, it is possible to preserve the structural integrity of the panel heater.

Generally speaking acrylonitrile butadiene styrene (ABS) is a suitable material for manufacture of the casing. A suitable fire retardant material is a cement sand/polymer material sold under the Trade Mark LARCEM 200 which is manufactured and sold by the Larcem Group of Belfast, Northern Ireland. This polymer used offers particularly good heat retention, thus providing a relatively gentle heat increase or decrease on turning on or off the panel heater and also providing adequate heat distribution on the outer surface of the panel heater.

What is claimed is:

1. A panel heater for animal use comprising:
   a hollow substantially rectangular open-mounted container-like outer shell, having a base, the outer surface of which forms an animal contacting heating surface and four upstanding outwardly inclined side walls;
   a plurality of upstanding bollards mounted on the base within the shell;
   a separate rectangular electrical junction box within the shell formed from three upstanding interior walls mounted on the base and contracting the interior of a side wall thereof and having exterior communication means for electrical power supply cable formed by a hole in the side wall and interior communication means formed from a pair of spaced apart holes in an interior wall thereof;
   base connectors within the junction box for connection to electrical power cables and to a heating element;
   a heating element formed from an electrical resistance wire having a pair of end connectors fast on the base connector in the junction box, the electrical resistance wire being led through one of the holes in an interior wall of the junction box around the bollards spaced apart from the base to form one continuous path of wire within the shell and then back through the other hole to the base connector;
   a plurality of anchorage means mounted on the base within the shell, each anchorage means having at least one surface spaced apart from, above and facing the inner surface of the base to secure fire retardent material to the base;
   fire retardant material filling the shell to above the electrical resistance wire;
   a heat insulation panel mounted on top of the fire retardant material; and
   a closure lid, forming the ground contacting base of the panel heater, mounted on the heat insulation material to close the shell.

2. A panel heater as claimed in claim 1 in which each anchorage means comprises an upstanding bored plate with its bore axis substantially parallel to the plane of the base.

3. A panel heater as claimed in claim 1 in which each anchorage means comprises a tunnel-like body formed from a substantially half-cylindrical shaped member.

4. A panel heater as claimed in claim 1 in which there are additional anchorage means mounted on the interior of the side walls of the shell.

5. A panel heater as claimed in claim 1 in which there are four corner bollards adjacent each corner of the base and in which the remainder of the bollards form two sets of opposed in-line side bollards sited inwards of a pair of adjacent corner bollards, one of the sets of side bollards being adjacent the side wall forming part of the junction box.

6. A panel heater as claimed in claim 1 in which there is a corner bollard adjacent each corner of the base and in which the remainder of the bollards form two sets of opposed in-line side bollards sited inwards of a pair of adjacent corner bollards, one of the set of side bollards comprising a pair of bollards adjacent the side wall forming part of the junction box and the other set comprising four side bollards.

7. A panel heater as claimed in claim 1 in which each bollard has an arcuate cylindrical resistance wire contacting surface and includes additional anchorage means adjacent the free end thereof, said anchorage means having at least one surface spaced-apart from, above and facing the inner surface of the base.

8. A panel heater as claimed in claim 1 in which each bollard has an arcuate cylindrical resistance wire contacting surface and includes additional anchorage means formed by a capping member projecting laterally of the free end thereof.

9. A panel heater as claimed in claim 1 in which the bollard is recessed for reception and support of the electrical resistance wire spaced apart from the base.

10. A panel heater as claimed in claim 1 in which each side wall is bent outwards adjacent its free edge substantially parallel to the base and then substantially vertically to form a recess for reception of the lid.

11. A panel heater for animal use comprising:
- a hollow substantially rectangular open-mounted container-like outer shell, having a base, the outer surface of which forms an animal contacting heating surface and four upstanding outwardly inclined side walls;
- a plurality of upstanding bollards each having an electrical resistance wire support and each bollard being mounted on the base within the shell with the wire support spaced apart from the base;
- a separate rectangular electrical junction box within the shell formed from three upstanding interior walls mounted on the base and contacting the interior of a side wall thereof and having exterior communication means for electrical power supply cable formed by a hole in the side wall and interior communication means formed from a pair of spaced apart holes in an interior wall thereof;
- base connectors within the junction box for connection to electrical power cables and to a heating element;
- a heating element formed from an electrical resistance wire having a pair of end connectors, the electrical resistance wire being led through one of the holes in an interior wall of the junction box around the bollards to form one continuous path of wire within the shell and then back through the other hole;
- a plurality of anchorage means mounted on the base within the shell, each anchorage means having at least one surface spaced apart from, above and facing the inner surface of the base to secure fire retardent material to the base;
- fire retardant material filling the shell to above the electrical resistance wire, the fire retardant material including a first layer supporting the heating element in spaced apart relationship with the base and a second layer covering the first layer, additional anchorage means embedded in the first and the second layers to connect the first and the second layer together;
- a heat insulation panel mounted on top of the fire retardant material; and
- a closure lid, forming the ground contacting base of the panel heater, mounted on the heat insulation material to close the shell.

12. A panel heater as claimed in claim 11 in which the electrical resistance wire support is formed by a recess in the bollard.

13. A panel heater as claimed in claim 11 in which each bollard includes an additional anchorage means adjacent the free end thereof, said anchorage means having at least one surface spaced-apart from, above and facing the inner surface of the base.

14. A panel heater as claimed in claim 11 in which each bollard includes an additional anchorage means formed by a capping member projecting laterally of the free end thereof.

15. A panel heater as claimed in claim 11 in which each anchorage means comprises a tunnel-like body formed from a substantially half-cylindrical shaped member.

16. A panel heater as claimed in claim 11 in which there are additional anchorage means mounted on the interior of the side walls of the shell.

17. A panel heater as claimed in claim 11 in which there are four corner bollards adjacent each corner of the base and in which the remainder of the bollards form two sets of opposed in-line side bollards sited inwards of the pair of adjacent corner bollards, one of the set of side bollards being adjacent the side wall forming part of the junction box.

18. A panel heater as claimed in claim 11 in which there is a corner bollard adjacent each corner of the base and in which the remainder of the bollards form two sets of opposed in-line side bollards sited inwards of a pair of adjacent corner bollards, one of the set of side bollards comprising a pair of bollards adjacent the side wall forming part of the junction box and the other set comprising four side bollards.

* * * * *